United States Patent [19]

Ta-Yung

[11] Patent Number: 5,435,158
[45] Date of Patent: Jul. 25, 1995

[54] STEERING WHEEL LOCK

[76] Inventor: Hsieh Ta-Yung, P.O. Box 1032, Tainan-Nan Road, Jung-Heh, Taipei Hsien, Taiwan

[21] Appl. No.: 191,106

[22] Filed: Feb. 3, 1994

[51] Int. Cl.⁶ .............................................. B60R 25/02
[52] U.S. Cl. .......................................... 70/209; 70/226
[58] Field of Search ................. 70/209, 212, 225, 226, 70/237, 238, 18, 211

[56] References Cited

U.S. PATENT DOCUMENTS 5,024,069  6/1991  Hull, Jr. et al. .................... 70/226 X
5,138,853  8/1992  Chen ................................. 70/238 X
5,259,222  11/1993  Jang ...................................... 70/209

Primary Examiner—Lloyd A. Gall
Attorney, Agent, or Firm—Pro-Techtor International

[57] ABSTRACT

An anti-theft device for a steering wheel of a vehicle includes a lock having a tube and a casing fixed on the tube, a catch received in the casing, a shank engaged the tube, an opening formed in the shank for engaging with the catch, two sleeves fixed on the shank and rotated in concert with the shank, two hooks fixed on the tube and two hooks fixed on the sleeves for engaging with the steering wheel. The hooks form two loops for engaging with the steering wheel such that the anti-theft device can be solidly secured to the steering wheel.

1 Claim, 4 Drawing Sheets

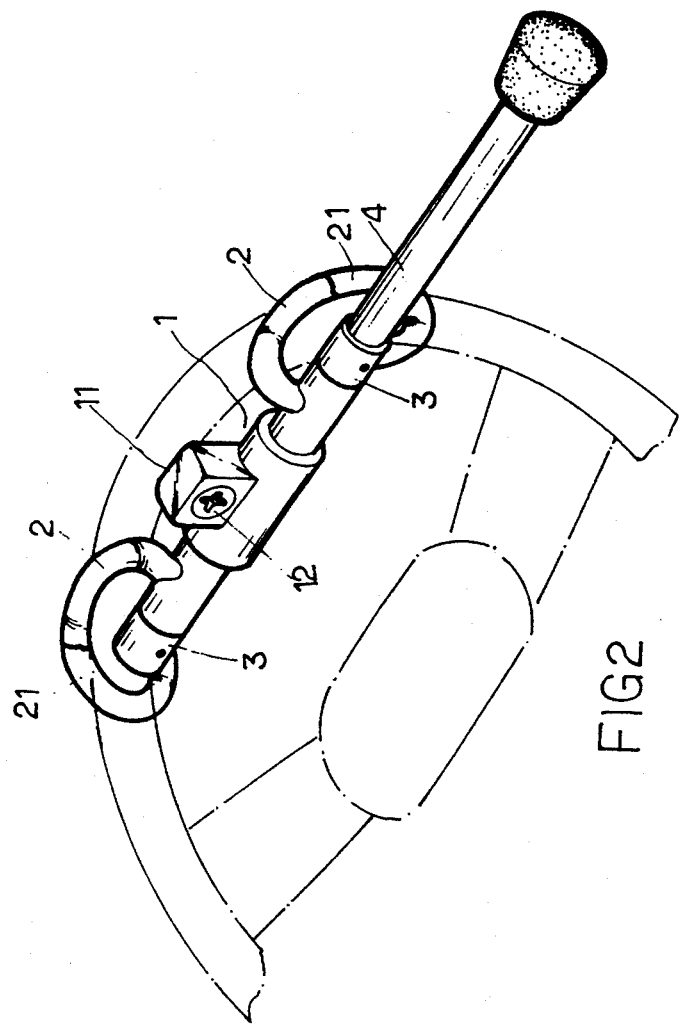
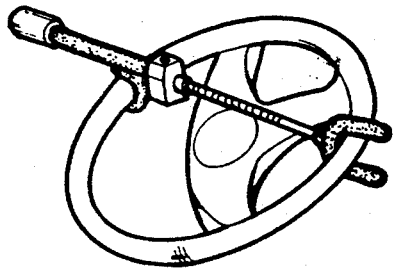
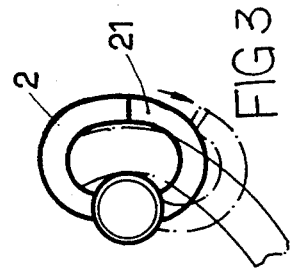

STEERING WHEEL LOCK

BACKGROUND OF THE INVENTION

1. Field of the Invention

The present invention relates to an anti-theft device, and more particularly to an anti-theft device for vehicles.

2. Description of the Prior Art

A typical anti-theft device for steering wheel of a vehicle is shown in FIG. 1 and comprises two hooks for engaging with the steering wheel and a shank for preventing the rotating of the steering wheel; however, the steering wheel is not suitably protected because the wheel is not enclosed, therefore the device can be disengaged from the steering wheel.

The present invention has arisen to mitigate and/or obviate the afore-described disadvantages of the conventional anti-theft devices for vehicles.

SUMMARY OF THE INVENTION

The primary objective of the present invention is to provide an anti-theft device which can be solidly secured to the steering wheel of the vehicles.

In accordance with one aspect of the invention, there is provided an anti-theft device for a steering wheel of a vehicle comprising a lock body including a tube, a casing fixed on the tube, a catch received in the casing, two first hooks secured on the tube for engaging with the steering wheel, a shank slidably and rotatably engaged in the tube and including an opening formed therein for engaging with the catch, two sleeves fixed on the shank and rotated in concert with the shank, two second hooks secured on the sleeves respectively for engaging with the steering wheel, the first hooks and the second hooks forming two loops for engaging with the steering wheel when the catch is engaged with the opening of the shank, whereby, the anti-theft device is solidly secured to the steering wheel.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a perspective view of a conventional anti-theft device;

FIG. 2 is a perspective view of an anti-theft device for a vehicle in accordance with the present invention.

FIG. 3 is a plan view illustrating the operation of the anti-theft device;

DETAILED DESCRIPTION OF THE PREFERRED EMBODIMENT

Figure 4:
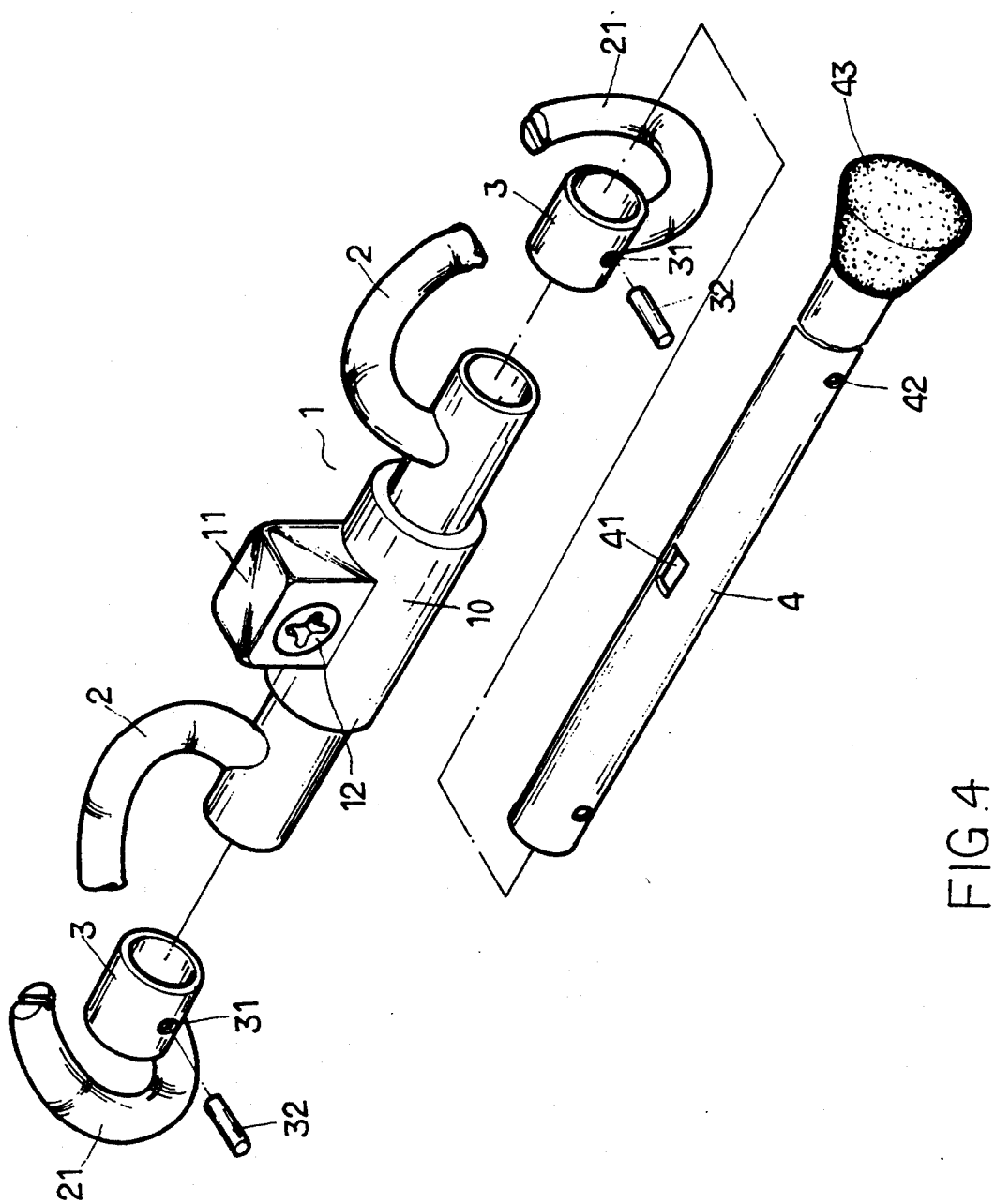
FIG. 4 is an exploded view of the anti-theft device.
Figure 5:
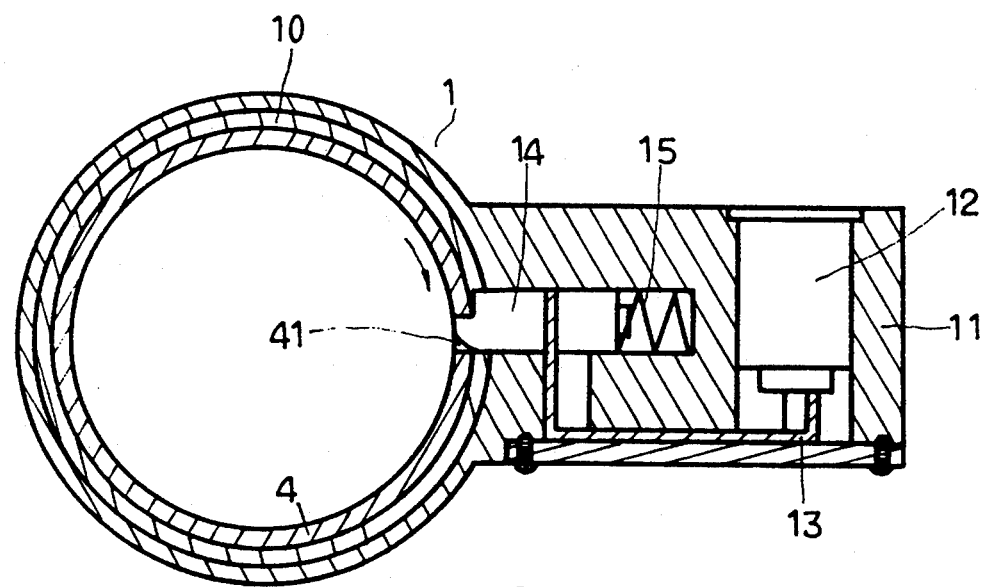
FIGS. 5 and 6 are cross sectional views illustrating the operation of the anti-theft device.
Figure 6:
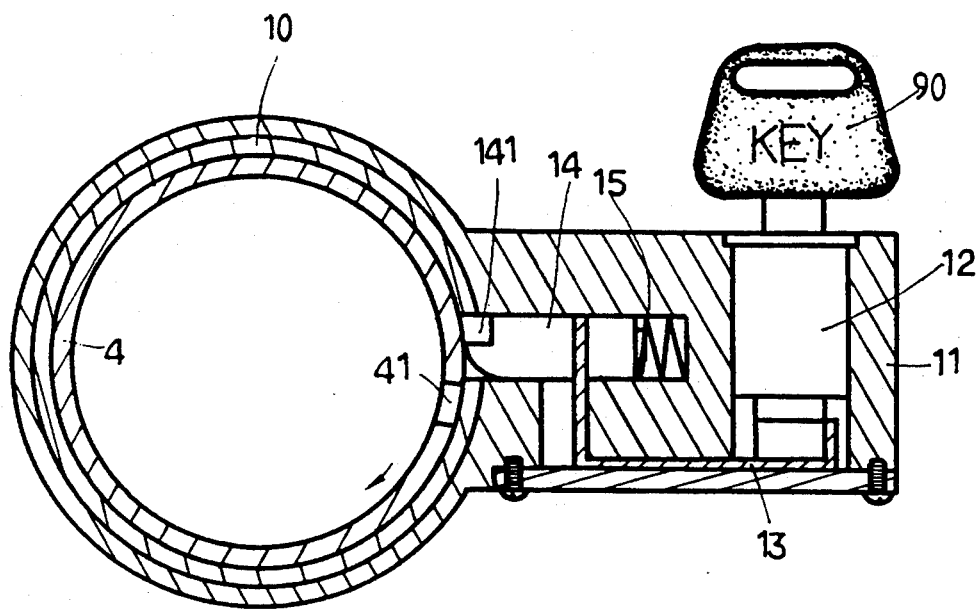

Referring to the drawings, and initially to FIGS. 2 to 6, an anti-theft device in accordance with the present invention comprises a lock body 1 including a tube 10 having a casing 11 provided thereon, a core 12 provided in the casing 11, a follower 13, a catch 14 and a spring 15 disposed in the casing 11, two hooks 2 secured on the tube 10, a shank 4 engaged in the tube 10 and including an opening 41 formed therein for engaging with the catch 14 which includes a notch 141 formed therein, best shown in FIGS. 5 and 6, two apertures 42 formed in the shank 4, two sleeves 3 engaged on the shank 4 and each including a hole 31 for engaging with a pin 32 so as to fix the sleeves 3 to the shank 4 such that the sleeves 3 rotate in concert with the shank 4, other hooks 21 secured to the sleeves 3 for engaging with the hooks 2 so as to form two enclosed loops (FIGS. 2 and 3) for engaging with the steering wheel, and a protective covering 43 fixed on the end portion of the shank 4.

In operation, as shown in FIG. 5, when the catch 14 is engaged with the opening 41 of the shank 4, the hooks 21 are engaged with the other hooks 2 such that the device can be solidly secured to the steering wheel, however, when a key 90 is engaged in the core 12 for actuating the catch 14, the catch 14 can be disengaged from the opening 41 of the shank 4 such that the shank 4 can be rotated relative to the tube 10, and such that the hooks 21, 2 can be disengaged from each other, as shown in dotted lines in FIG. 3, whereby, the device can be disengaged from the steering wheel.

Figure 7:
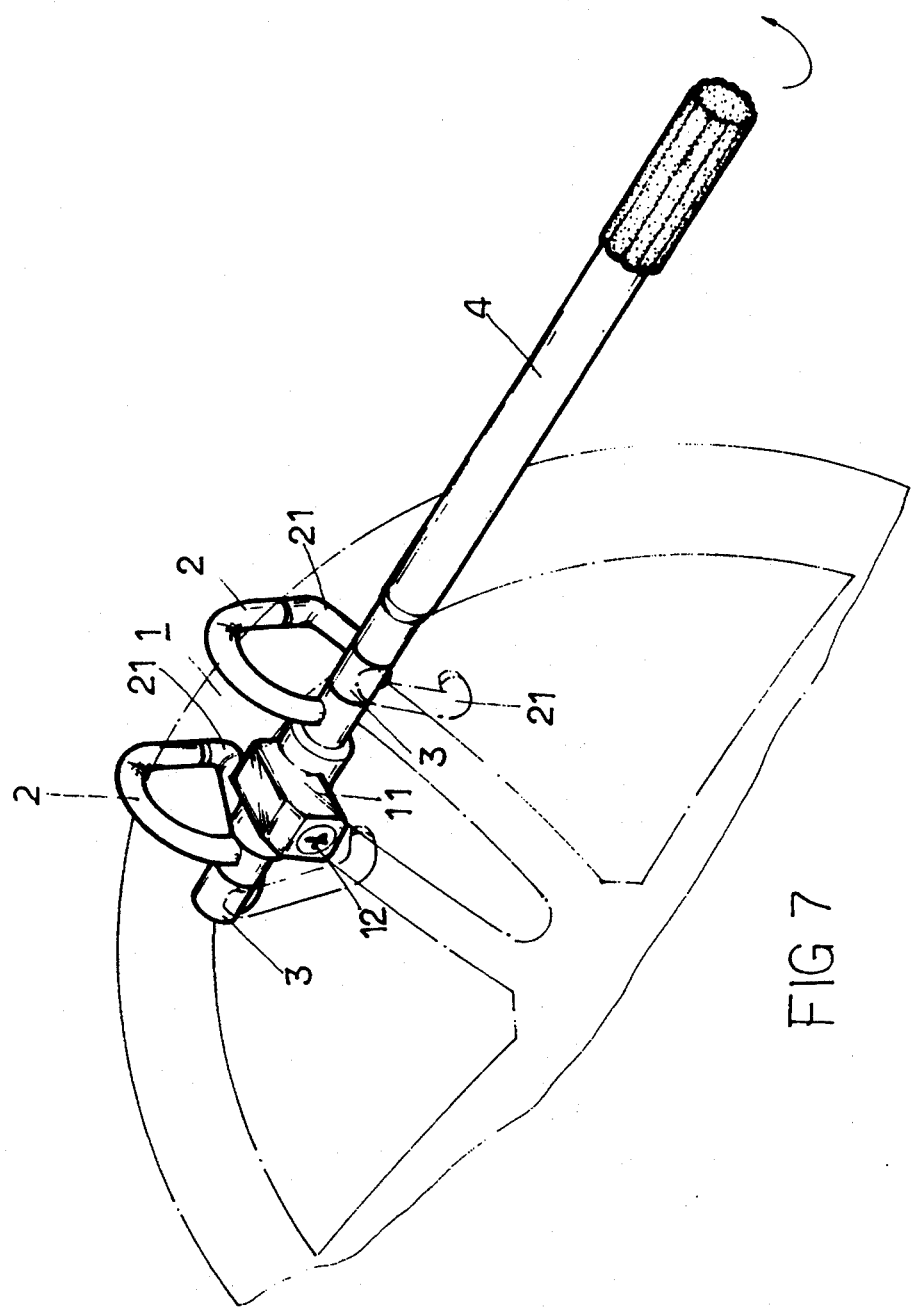
FIG. 7 is a perspective view illustrating another application of the anti-theft device.

Referring next to FIG. 7, the hooks 2, 21 may be made with other shapes as shown in this figure, similarly, the hooks 2, 21 can also be made with yet other configurations not illustrated herein. It is only required that the hooks 2, 21 form two loops for engaging with the steering wheel.

Accordingly, the anti-theft device in accordance with the present invention includes a configuration which can be solidly secured to the steering wheel of the vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An anti-theft device for a steering wheel of a vehicle comprising a lock body including a tube, a casing fixed on said tube, a catch received in said casing, first hooks secured on said tube for engaging with said steering wheel, a shank rotatably engaged in said tube and including an opening formed therein for engaging with said catch, two sleeves fixed on said shank and rotated in concert with said shank, two second hooks secured on said sleeves respectively for engaging with said steering wheel, said first hooks and said second hooks forming two loops for engaging with said steering wheel when said catch is engaged with said openings of said shank, whereby, said anti-theft device is solidly secured to said steering wheel.

* * * * *